(12) United States Patent  (10) Patent No.: US 8,731,472 B2
Choi et al.  (45) Date of Patent: May 20, 2014

(54) PORTABLE MOBILE APPARATUS PROVIDING SUPPLEMENTARY SERVICE FOR USER AND METHOD THEREOF

(75) Inventors: Dae Seon Choi, Daejeon (KR); Seung Hyun Kim, Daejeon (KR); Soo Hyung Kim, Daejeon (KR); Jong Hyouk Noh, Daejeon (KR); Sang Rae Cho, Daejeon (KR); Young Seob Cho, Daejeon (KR); Seung Hun Jin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 158 days.

(21) Appl. No.: 13/248,761

(22) Filed: Sep. 29, 2011

(65) Prior Publication Data

US 2012/0083213 A1  Apr. 5, 2012

(30) Foreign Application Priority Data

Sep. 30, 2010 (KR) ........................ 10-2010-0095418

(51) Int. Cl.
| | |
|---|---|
| H04W 88/02 | (2009.01) |
| H04W 4/00 | (2009.01) |
| H04W 88/06 | (2009.01) |
| H04B 7/00 | (2006.01) |
| H04W 4/16 | (2009.01) |
| H04W 4/12 | (2009.01) |

(52) U.S. Cl.
CPC .............. *H04W 4/008* (2013.01); *H04W 4/16* (2013.01); *H04W 88/06* (2013.01); *H04W 4/12* (2013.01)
USPC ........................................ 455/41.2

(58) Field of Classification Search
CPC ..... H04W 4/008; H04W 88/06; H04W 88/02; H04W 84/18; H04W 4/12
USPC ............... 455/41.2, 558, 412.1, 556.1, 550.1, 455/466, 413, 412.2
See application file for complete search history.

(56) References Cited

U.S. PATENT DOCUMENTS

| | | | | |
|---|---|---|---|---|
| 6,801,781 | B1 * | 10/2004 | Provost et al. | ................. 455/466 |
| 8,005,507 | B2 * | 8/2011 | Celik | ............................ 455/557 |
| 8,087,068 | B1 * | 12/2011 | Downey et al. | .................... 726/4 |
| 8,140,071 | B2 * | 3/2012 | Tak | ............................ 455/435.1 |
| 8,176,121 | B2 * | 5/2012 | Leblanc et al. | ............... 709/204 |

(Continued)

FOREIGN PATENT DOCUMENTS

| | | | |
|---|---|---|---|
| KR | 1020080096722 | A | 11/2008 |
| KR | 10-2009-0072071 | A | 7/2009 |
| KR | 10-2009-0112076 | A | 10/2009 |
| KR | 1020100065723 | A | 6/2010 |

*Primary Examiner* — Marceau Milord

(57) ABSTRACT

The prevent invention relates to a portable mobile apparatus for a user for providing a supplementary service and a method for providing a supplementary service by using the same, and more particularly, to an apparatus and a method for providing supplementary enhanced services by using an application run in a portable mobile terminal when the portable mobile terminal such as a cellular phone or a smart phone is used for a service through short-range RF communication. The present invention can provide a variety of supplementary services to the user by using an operation function included in the application in the mobile terminal when performing the services through the short-range RF communication. Specifically, it is possible to automate the supplementary function or provide convenience to the user and interact with the user.

20 Claims, 2 Drawing Sheets

(56) References Cited

U.S. PATENT DOCUMENTS

| | | | |
|---|---|---|---|
| 8,184,621 B2* | 5/2012 | Zhu et al. | 370/352 |
| 8,225,082 B2* | 7/2012 | Hans et al. | 713/2 |
| 8,306,505 B2* | 11/2012 | Bennett | 455/411 |
| 8,335,472 B2* | 12/2012 | Miyata | 455/41.2 |
| 8,457,603 B2* | 6/2013 | El-Kadri et al. | 455/414.1 |
| 8,494,584 B2* | 7/2013 | Cha | 455/558 |
| 8,504,832 B2* | 8/2013 | Kim et al. | 713/168 |
| 2009/0170481 A1 | 7/2009 | Cha | |

* cited by examiner

PORTABLE MOBILE APPARATUS PROVIDING SUPPLEMENTARY SERVICE FOR USER AND METHOD THEREOF

CROSS-REFERENCE TO RELATED APPLICATIONS

This application claims priority under 35 U.S.C. §119 to Korean Patent Application No. 10-2010-0095418, filed on Sep. 30, 2010 the Korean Intellectual Property Office, the disclosure of which is incorporated herein by reference in its entirety.

TECHNICAL FIELD

The prevent invention relates to a portable mobile apparatus providing supplementary service for user and a method thereof, and more particularly, to an apparatus and a method for providing supplementary enhanced services by using an application run in a portable mobile terminal when the portable mobile terminal such as a cellular phone or a smart phone is used for a service through short-range RF communication.

BACKGROUND

Currently, technologies such as a Visa Wave or a Pay Pass performing payment settlement in a contactless way using a short-range RF communication channel such as IEEE 14443 between a credit card including a smartcard chip of a consumer and a contactless dongle of a seller are being used and a technology performing the contactless payment settlement using a universal subscriber identity module (USIM) of a mobile terminal such as a cellular phone or a smart phone as a smartcard is being distributed. In addition, a technology storing a credit card or the like issued by Over The Air (OTA) in the USIM using a radio communication function of the cellular phone or the smart phone is also used.

Meanwhile, a contactless payment settlement system using a mobile terminal is constituted of a short-range RF communication dongle of a seller, a series of payment settlement service units having a POS connected thereto, and a mobile terminal of a purchaser.

The mobile terminal of the purchaser includes a short-range RF communication module, an applet run in a USIM storing credit card information and performing a payment operation, and an application in the mobile terminal interacting with the applet in the USIM so as to issue and manage the credit card information.

An operation process of the contactless payment settlement using the mobile terminal is described below.

First, the application of the mobile terminal receives issued credit card information and transmits the credit card information to the applet in the USIM, and the applet in the USIM stores the issued credit card information. For instance, when the mobile terminal is close to the vicinity of the short-range RF communication dongle, the short-range RF communication dongle transmits a request message. A short-range RF communication module transmits the request message received from the short-range RF communication dongle to the applet in the USIM. The applet in the USIM receiving the request message transmits a response message including the credit card information to the short-range RF communication module. That is, the response message including the credit card information is transmitted to the short-range RF communication dongle in a reverse route of the receiving route of the request message. The short-range RF communication dongle transmits the received credit card information to the payment settlement service unit including the POS and the payment settlement service unit performs a payment settlement service.

Meanwhile, in a contactless payment settlement service of an existing mobile terminal, the application in the mobile terminal issues and manages a credit card. That is, the contactless payment settlement service is performed in the order of the short-range RF communication dongle, the short-range RF communication module of the mobile terminal, the applet in the USIM, the short-range RF communication module of the mobile terminal, and the short-range RF communication dongle.

As described above, in the related art, since the application in the mobile terminal is not included in the step of performing the contactless payment settlement service, the applet in the USIM and the application in the mobile terminal cannot exchange a message. Therefore, there is a problem in that it is impossible to provide a variety of supplementary services (e.g., interaction that reflects the opinion of a user by queries or the like) using the application in the mobile terminal to the user (purchaser).

SUMMARY

An exemplary embodiment of the present invention provides a portable mobile apparatus for a user for providing a supplementary service, including: a short-range RF communication module receiving optional information of the supplementary service from a service apparatus; a universal subscriber identity module (USIM) transmitting the optional information received through the short-range RF communication module; and an application selecting a supplementary service option on the basis of the optional information transmitted from the USIM and transmitting information necessary to provide the selected supplementary service option to the service apparatus through the short-range RF communication module.

Another exemplary embodiment of the present invention provides a portable mobile apparatus for a user for providing a supplementary service to a user by using short-range RF communication with a service apparatus, including: a universal subscriber identity module (USIM) transmitting optional information of the supplementary service received from the service apparatus through the short-range RF communication; and an application selecting a supplementary service option to be provided on the basis of the optional information transmitted from the USIM and transmitting information necessary to provide the selected supplementary service option to the service apparatus through the short-range RF communication.

Yet another exemplary embodiment of the present invention provides a method for providing a supplementary service by using a portable mobile apparatus for a user, the method including: receiving optional information of the supplementary service from a service apparatus through short-range RF communication; selecting a supplementary service option on the basis of the received optional information; and transmitting information necessary to provide the selected supplementary service option to the service apparatus through the short-range RF communication.

Still another exemplary embodiment of the present invention provides a method for providing a supplementary service by using a portable mobile apparatus for a user for providing a service to the user by using short-range RF communication with a service apparatus, the method including: transmitting optional information of the supplementary service received through short-range RF communication; and transmitting information necessary to provide the supplementary service option selected on the basis of the transmitted optional information to the service apparatus through the short-range RF communication.

Other features and aspects will be apparent from the following detailed description, the drawings, and the claims.

DETAILED DESCRIPTION OF EMBODIMENTS

Figure 1:
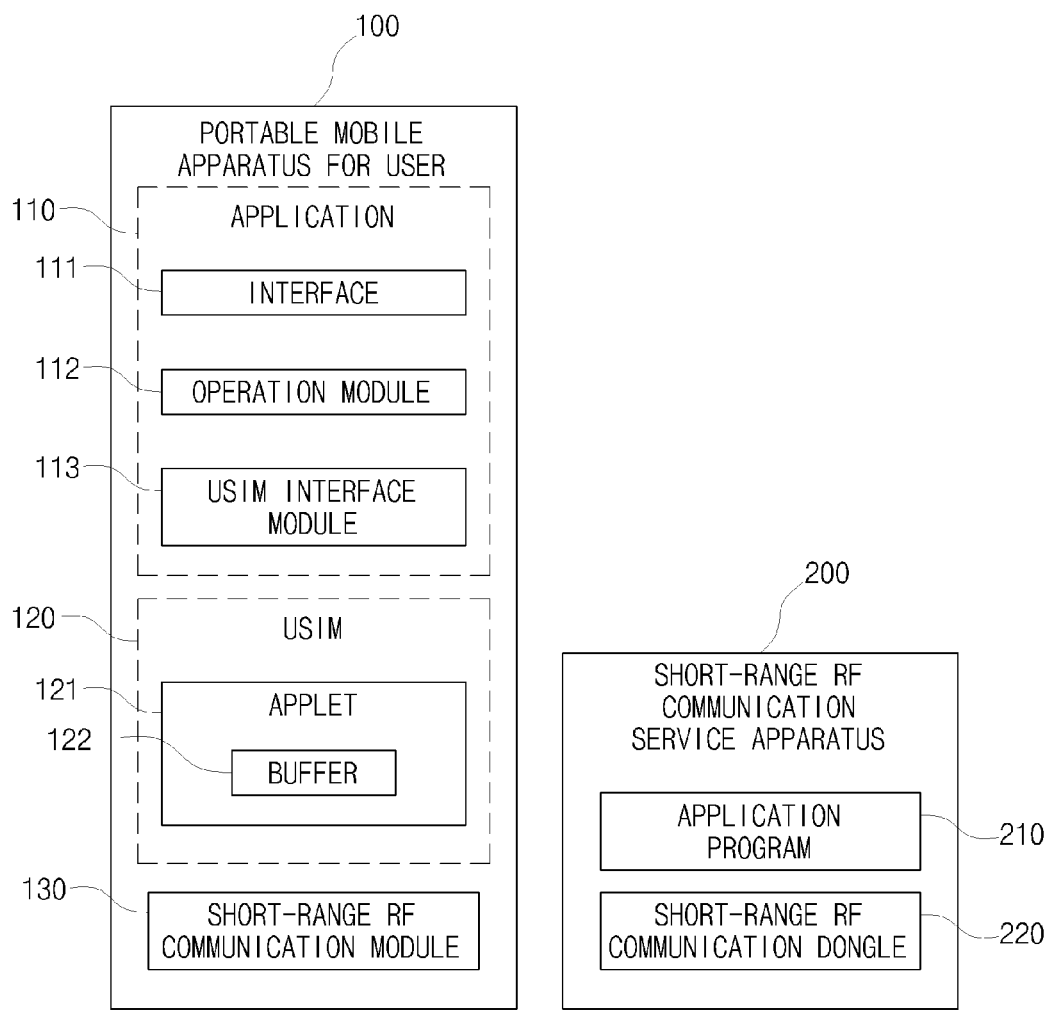
FIG. 1 is a block diagram illustrating a portable mobile apparatus for a user for providing a supplementary service according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Meanwhile, terms used in the present invention are to explain exemplary embodiments rather than limiting the present invention. In the specification, a singular type may also be used as a plural type unless stated specifically. "Comprises" and/or "comprising" used herein does not exclude the existence or addition of one or more other components, steps, operations and/or elements.

Hereinafter, a portable mobile apparatus for a user for providing a supplementary service according to an exemplary embodiment of the present invention is described with reference to FIG. 1. FIG. 1 is a block diagram illustrating a portable mobile apparatus for a user for providing a supplementary service according to an exemplary embodiment of the present invention.

As shown in FIG. 1, a portable mobile apparatus 100 for a user may be a cellular phone, a smart phone or the like and includes an application 110, a USIM 120, and a short-range RF communication module 130.

The application 110 as an application program providing an application using short-range RF communication is exemplified by an electronic wallet and includes an interface 111 for user interaction, a USIM interface module 113 for interacting with the USIM 120, and an operation module 112 taking charge of logics of other applications.

The USIM 120 means a universal subscriber identity module and includes an applet 121. The USIM 120 may run an applet 121 program itself and use the short-range RF communication through an interface with the short-range RF communication module 130.

The applet 121 includes a buffer 122 for interacting with the application 110.

The short-range RF communication module 130 provides short-range radio communication such as IEEE14443 or Bluetooth specification and includes an antenna (not shown) for radio communication.

Meanwhile, a short-range RF communication service apparatus 200 includes an application program 210 and a short-range RF communication dongle 220 and provides an application service (supplementary service) to a user by interacting with the portable mobile apparatus 100 for a user using the short-range RF communication. An example of the supplementary service provided by the short-range RF communication service apparatus 200 is a credit card payment settlement service.

Figure 2:
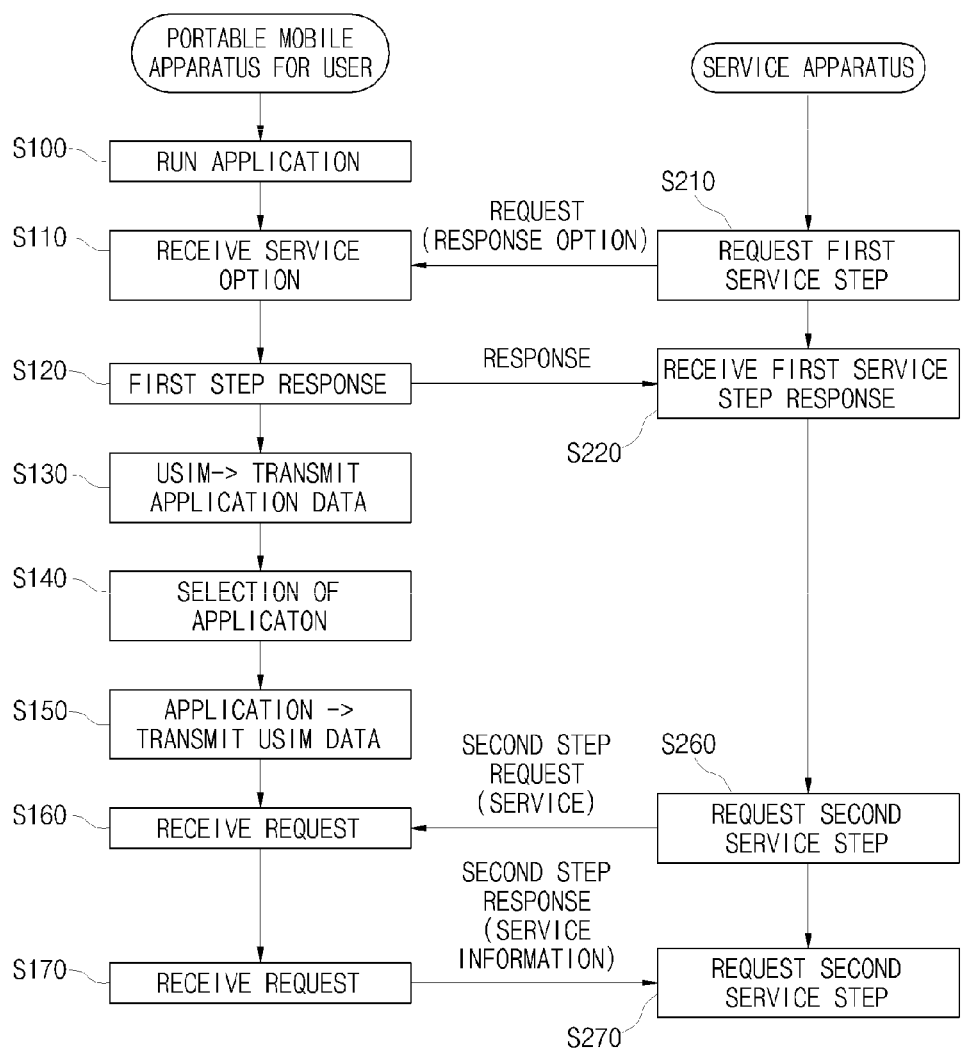
FIG. 2 is a flowchart illustrating a method for providing a supplementary service by using a portable mobile apparatus for a user according to an exemplary embodiment of the present invention.

As such, the portable mobile apparatus for a user for providing a supplementary service according to the exemplary embodiment of the present invention is described with reference to FIG. 1. Hereinafter, a method for providing a supplementary service using a portable mobile apparatus for a user according to an exemplary embodiment of the present invention is described with reference to FIG. 2. FIG. 2 is a flowchart illustrating a method for providing a supplementary service by using a portable mobile apparatus for a user according to an exemplary embodiment of the present invention.

As shown in FIG. 2, in a portable mobile apparatus 100 for a user, an application 110 and an applet 121 program are installed and the applet 121 stores information for a supplementary service (e.g., credit card information). An initial operation mode of a short-range RF communication dongle 220 is set to a first service step.

The portable mobile apparatus 100 for a user executes the application 110 according to a user's operation. For instance, the application 110 is run (S100) and a USIM interface module 113 polls a buffer 122 periodically.

When the portable mobile apparatus 100 for a user is close to the vicinity of the short-range RF communication dongle 220 by a user, a request message is transmitted from the short-range RF communication dongle 220 to the portable mobile apparatus 100 for a user (S210), and the short-range RF communication module 130 receives the request message and provides the received request message to the applet 121 (S110).

The request message includes optional information of the supplementary service. For instance, when the service is a credit card payment settlement service, the optional information may be an affiliate ID, discounts for each card, and the like.

The applet 121 transmits a response message to the short-range RF communication dongle 220 through the short-range RF communication module 130 (S120), and the short-range RF communication dongle 220 receives the response message and switches the operation mode to a second service step (S220).

It is not necessary for the portable mobile apparatus 100 for a user to be positioned in the vicinity of the short-range RF communication dongle 220 until S150 described below.

The applet 121 inputs the optional information received in S110 to the buffer 122 and transmits the inputted optional information to the application 110 (S130). For instance, the USIM interface module 113 polls the buffer 122 periodically and when the buffer 122 is filled with the optional information, the USIM interface module 113 reads the optional information.

The application 110 may allow an operation module 112 to automatically select a supplementary service option on the basis of the optional information acquired in S130 or notify a user of the optional information through the interface 111 so that the user selects a supplementary service option, and inquire about a user's choice (S140). In this case, the operation module 112 may provide a recommended choice (supplementary service option) to the user and verify whether the provided recommended choice is selected by the user or not. An example of providing the recommended choice is selecting a credit card allowing the best discount and suggesting the selected credit card to the user.

The application 110 records a choice value of a supplementary service option selected automatically or by the user in S140 in the buffer 122 (S150).

The portable mobile apparatus 100 for a user is positioned in the vicinity of the short-range RF communication dongle 220 by the user. In this case, the short-range RF communication dongle 220 operates in the second service step mode switched in S120. That is, the short-range RF communication dongle 220 operating in the second service step mode transmits a second step request message to the portable mobile apparatus 100 for a user. The short-range RF communication module 130 receives the second step request message and provides the received second step request message to the applet 121 (S160).

The second step request message includes information necessary for a service (e.g., credit card number).

The application 110 generates a response message (e.g., credit card number) based on information (e.g., selected credit card) recorded in the buffer 122 in S150 and transmits the response message to the short-range RF communication dongle 220 through the short-range RF communication module 130. The short-range RF communication dongle 220 transmits the received response message to the application program 210 and completes the supplementary service (e.g., credit card payment settlement)(S170). Thereafter, the short-range RF communication dongle 220 switches the operation mode back to the initial first service step.

As described above, the present invention can provide a variety of supplementary services to the user by using an operation function of the application in the mobile terminal when performing the service through the short-range RF communication. Specifically, it is possible to automate the supplementary function or provide convenience to the user and interact with the user.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable mobile apparatus using short-range radio frequency (RF) communication with a service device providing a supplementary service to a user of the portable mobile apparatus, the apparatus comprising:
   a short-range RF communication module;
   a universal subscriber identity module (USIM) having an applet and a buffer; and
   an application having an interface, an operation module, and an USIM interface module,
   wherein the short-range RF communication module is configured to receive a first request message from a service device providing a supplementary service to a user of a portable mobile apparatus, and
   wherein the USIM is configured to
      receive the first request message, the first request message containing a first service information, from the short-range RF communication module,
      input, by the applet, the first service information into the buffer of the USIM, and
      generate a response message transmitted to the service device through the short-range RF communication module, and
   wherein the USIM interface module of the application is configured to poll the buffer periodically and read the first service information in the buffer into the application.

2. The portable mobile apparatus of claim 1, wherein the application is configured to select the supplementary service to be provided to the user based on the first service information and to record a selection value in the buffer.

3. The portable mobile apparatus of claim 2,
   wherein the short-range RF communication module is further configured to receive a second request message from the service device,
   wherein the USIM is further configured to receive the second request message from the short-range RF communication module, the second request message containing a second service information required to perform the supplementary service, and
   wherein the application is further configured to generate a response to the second request message using the selection value in the buffer and to provide the response to the second request message to the service device to perform the selected supplementary service.

4. The portable mobile apparatus of claim 3, wherein the response to the second request message includes credit card information.

5. The portable mobile apparatus of claim 1, wherein the application
   is configured to notify the user of the first service information and receive the selection of the supplementary service to be provided from the user and to record a selection value in the buffer.

6. The portable mobile apparatus of claim 5,
   wherein the short-range RF communication module is further configured to receive a second request message from the service device,
   wherein the USIM is further configured to receive the second request message from the short-range RF communication module, the second request message containing a second service information required to perform the supplementary service, and
   wherein the application is further configured to generate a response to the second request message using the selection value in the buffer and to provide the response to the second request message to the service device to perform the selected supplementary service.

7. The portable mobile apparatus of claim 6, wherein the response to the second request message includes credit card information.

8. The method of claim 6, wherein the first and second request messages are received when the portable mobile apparatus is close to the service device.

9. The portable mobile apparatus of claim 5, wherein the operation module recommends a supplementary service to the user through the interface.

10. The portable mobile apparatus of claim 1, wherein the supplementary service is a credit card payment settlement service.

11. The portable mobile apparatus of claim 10, wherein the first service information includes an affiliate identification.

12. A method for providing a supplementary service from a service device to a user of a portable mobile apparatus using short-range RF communication, the method comprising:

receiving a first request message from a service device providing a supplementary service to a user of a portable mobile apparatus, wherein the first request message contains a first service information;

transmitting a response to the first request message to the service device;

processing a selection of the supplementary service, wherein the processing includes storing the first service information in a buffer of a universal subscriber identity module (USIM) having an applet and a buffer, and polling, by an USIM interface module of an application, the buffer periodically and reading the first service information in the buffer into the application;

receiving a second request message from the service device, wherein the second request message contains a second service information; and transmitting a response to the second request message to the service device, wherein the response to the second request message includes a selection value for use by the service device to perform the supplementary service.

13. The method of claim 12, wherein the receiving the first request message includes receiving the first request message through short-range radio frequency (RF) communication when the portable mobile apparatus is close to the service device in a first operation mode, and wherein the receiving the second request message includes receiving the second request message through short-range radio frequency (RF) communication when the portable mobile apparatus is close to the service device in a second operation mode.

14. The method of claim 12, wherein the processing a selection of the supplementary service includes notifying the user of the first service information, receiving the selection of the supplementary service from the user, and recording the selection value in the buffer of the USIM.

15. The method of claim 14, wherein the notifying includes recommending a supplementary service option to the user.

16. The method of claim 12, wherein the processing a selection of the supplementary service includes selecting, by the application, the supplementary service to be provided to the user based on the first service information, and recording the selection value in the buffer of the USIM.

17. The method of claim 12, wherein the supplementary service is a credit card payment settlement service.

18. The method of claim 17, wherein the first service information includes an affiliate identification.

19. The method of claim 12, wherein the response to the second request message includes credit card information.

20. The method of claim 12, wherein the processing occurs when the portable mobile apparatus is not close to the service device.

* * * * *